Patented Feb. 15, 1944

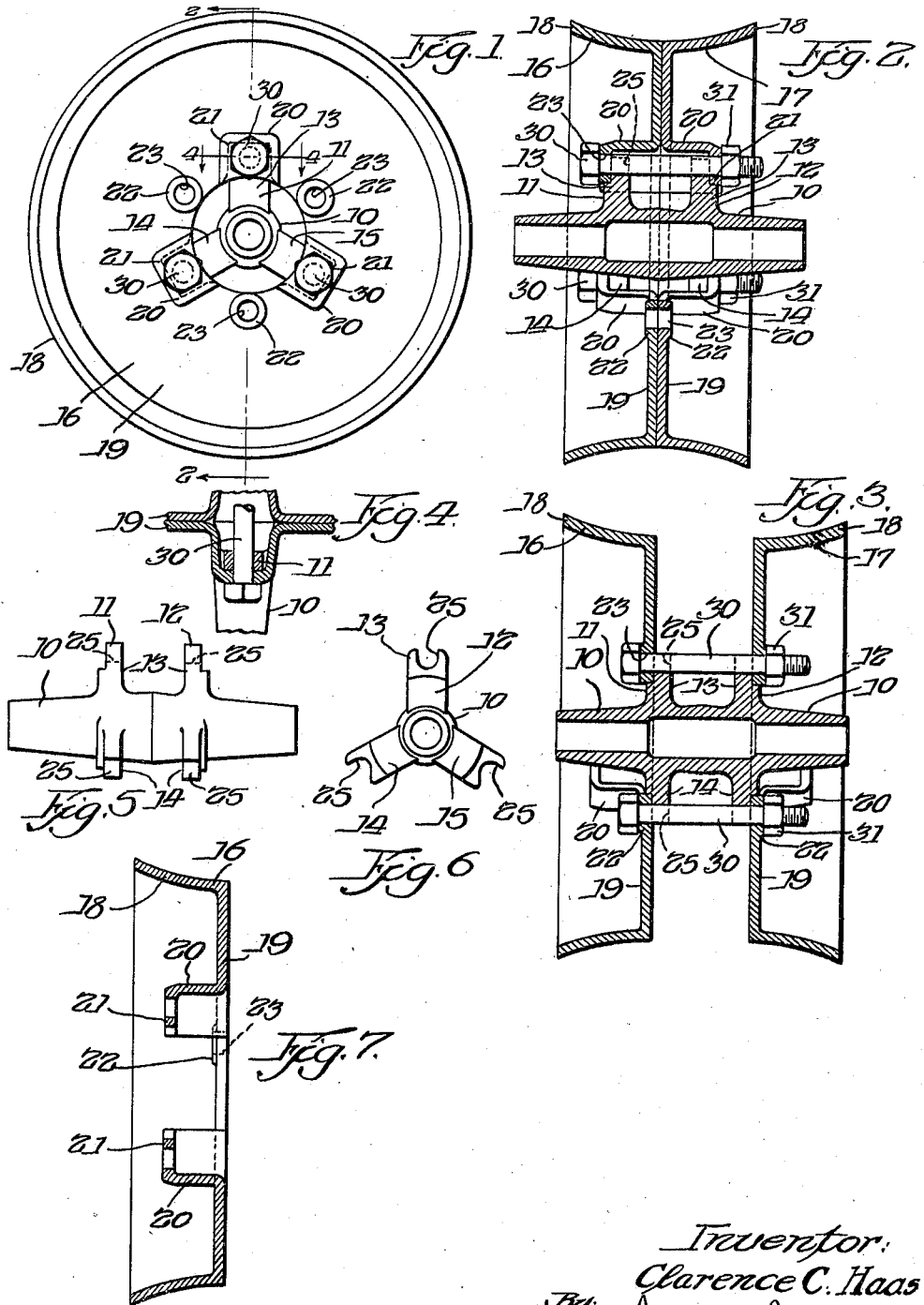

2,341,770

UNITED STATES PATENT OFFICE 2,341,770

COVERING WHEEL

Clarence C. Haas, Richmond, Ind., assignor to International Harvester Company, a corporation of New Jersey Application February 13, 1942, Serial No. 430,779

3 Claims. (Cl. 97—56)

This invention relates to covering and press wheels for planting equipment.

It is an object of the present invention to provide in a covering and press wheel for planting equipment, means whereby the same may be adjustable to render the same adaptable for use in different types of soils and in different planting operations.

It is another object of the invention to provide in a laterally adjustable type of covering wheel arrangement, means for the attachment of opposed covering wheel elements to a hub wherein the same fastening bolts are used for connecting the same to the hub element in both of their laterally adjusted positions and wherein the adjustment may be made without removal of the hub element from its supporting structure.

According to the present invention, there is provided a hub element having two axially spaced sets of radially extending and circumferentially spaced projections, each set of which is adapted for the connection thereto of a covering wheel element. Each covering wheel element has two sets of axially spaced attaching portions which with the projections on the hub provide means for attaching the covering elements in laterally adjusted positions. The adjustment of the wheel elements is made with respect to the hub element and the hub element need not be removed from its supporting structure.

For other objects and for a better understanding of the invention reference may be had to the following detailed description taken in connection with the accompanying drawing, in which:

Figure 1 is a view in elevation of the covering and press wheel and showing in plan one of the covering wheel elements as assembled on the hub element with its projections lying in their respective indentures as when the wheel elements are arranged in closed formation;

Figure 2 is an elevational view in section of the hub and of the covering wheels arranged on the hub in closed formation and taken along the line 2—2 of Figure 1;

Figure 3 is an elevational view in section similar to Figure 2 but with the wheel elements assembled on the hub element in laterally spaced or open relationship with respect to each other;

Figure 4 is a detail sectional view taken along the line 4—4 of Figure 1;

Figures 5 and 6 are respectively side and end views in elevation of the hub element; and Figure 7 is a sectional view of one of the single covering wheel elements.

Referring now to the drawing, there is shown a hub element 10 having axially spaced sets 11 and 12 of radially extending and circumferentially spaced projections 13, 14, and 15. These sets of radially extending projections serve respectively for the attachment thereto of opposed covering wheel elements 16 and 17. These covering wheel elements are fashioned to have a greater diameter on their outer edge than across the inner edge, whereby as the covering wheel passes over the ground a ridge of earth is formed over the seed previously planted in the ground.

Referring to Figures 1 and 7, it will be noted that the covering wheel element has a rim portion 18 and a radially extending portion 19. The radially extending portion 19 is located along the inner edge of the wheel element and has indented therein a set of three angularly spaced indentures 20. These indentures provide attaching portions 21 located axially removed from the inner edge of the wheel element. Different indentures are arranged for registry over the projections 13, 14, and 15 of a single set of the radially extending projections on the hub element 10. The covering wheel element, shown in Figure 7, is that arranged for the connection with the set 11 of projections on the hub 10.

When the covering wheel element 16 is fitted with its indentures 20 over the set 11 of the radially extending projections of the hub, the same will be located in a position such as shown in Figures 2 and 4. If the opposing covering wheel 17 is similarly disposed on its set 12 of radially extending projections in a manner so that its indentures 20 fit respectively over the projections, its inner edge or radially extending portion will bear against the radially extending portion of the covering wheel element 16, and the two covering wheel elements will lie in close relationship.

When the soil is of a sandy nature and not of a clayey type which tends to harden as it dries, these covering elements are so disposed in this close relationship. The soil is thus packed over the seed previously laid in the seed furrow. Also the covering wheel is used in this formation when the same is used for covering the seed disposed in the bottom of a lister furrow where the lateral dimensions of the bottom of the furrow are not enough to permit the use of the covering wheel of a type arranged with its covering wheel elements in spaced relation.

The radially extending portion 19 of each covering wheel element also has attaching portions 22 lying flush with the inner edge of the wheel. When it is desired to have the covering wheel elements arranged for open relationship on the hub 10, these attaching portions 22 are used, see Figure 3. These attaching portions are similar to the attaching portions formed in the indented portions in that they have also holes 23 therethrough which are angularly spaced about the covering wheel element and adapted likewise for registry with the respective projecting portions 13, 14, and 15 of the sets of projections on the hub element 10. With these portions being used, the covering wheel elements will be arranged in open relationship and laterally spaced as distinguished from their close relationship, such as shown in Figure 2. Where the covering wheel is to be used on soil which is of a clayey nature, it is desirable that the portion of the ridge formed immediately over the seeds and centrally thereof be left in an unpacked or unpressed condition. With the ridge left in this condition, the tendency is not so great for the soil to become caked or harden immediately above the seed and in such a manner as to completely prevent the seed from projecting upwardly through the earth.

On each of the projections of the respective sets of projections there is provided an open-ended slot 25. Each of the slots, however, in the respective projections, are respectively differently shaped. This difference is only necessary in order to render the hub element easy to cast.

Coming now to the securing of the covering wheels 16 and 17 on the sets 11 and 12 of the radially extending projections of the hub 10, there is used a set of three fastening bolts 30. These fastening bolts extend through openings in the attaching portions on the radially extending portions of each of the respective covering wheel elements. Once the wheels have been brought into place the fastening bolts 30, adapted to fit within the slots 25, are put in place and with the nuts 31 of the respective bolts 30 being tightened, the covering wheel elements 16 and 17 will be firmly secured against the respective sets of projections on the hub element 10.

Within the attaching portions so formed on the covering wheel elements the same fastening bolts are used in securing the covering wheel element to the hub element in both their closed and open settings.

It should now be apparent that there has been provided a covering wheel element of the laterally adjustable type, wherein the same is adaptable for different types of soil in that the covering wheel elements can be so adjusted on the hub element that they can be made to lie either in a close relation or in an open relation.

While various changes may be made in the detail construction, it shall be understood that such changes shall be within the spirit and scope of the present invention as defined by the appended claims.

What is claimed is:

1. In a covering and press wheel for planting equipment, a hub member having radially-projecting circumferentially-spaced attaching bosses each having a bolt-receiving space, a wheel element adjustable axially on said hub member to change the width of said wheel, said wheel element comprising axially-spaced sets of hub-attaching portions each having a bolt-receiving space, the hub-attaching portions in each set being spaced circumferentially about the wheel element axis and alternately with those of the other set, the spacing of the hub-attaching portions in each set also corresponding to that of the hub bosses so that the bolt-receiving spaces in either set will aline axially with respective of the bolt-receiving spaces in said bosses in fastening relation therewith, and bolts insertable in said alined bolt-receiving spaces to fasten the wheel element to the hub member, and the hub-attaching portions in one of said sets being projectable axially of the hub member into positions between said bosses pursuant to placing the hub-attaching portions in the other set into fastening relation with said bosses.

2. In a covering and press wheel for planting equipment, a hub member having radially-projecting circumferentially-spaced attaching bosses each having a bolt-receiving space; a wheel element including a rim, a web extending radially inwardly from said rim, attaching portions in the form of axially projected portion of said web, a set of bolt-receiving spaces in said attaching portions having a radial and circumferential spacing corresponding to that of the bolt-receiving spaces in the hub bosses to respectively axially aline therewith, and a second set of bolt-receiving spaces within the body of said web between said axially projecting portions, the bolt-receiving spaces of the second set also being radially and circumferentially spaced to respectively aline with the bolt-receiving spaces in the hub bosses upon rotation of the wheel element sufficiently to carry the axially projected portions into respective alinement with spaces between said bosses, the last named spaces being sufficiently large to receive the axially projected portions upon axial movement of the wheel element to carry the second set of bolt-receiving spaces into close alined relation with the bolt-receiving spaces in said bosses; and fastening bolts in the spaces in said bosses and insertable into either set of the bolt-receiving spaces alined therewith.

3. In a planting equipment cover and press wheel wherein there are wheel elements attachable to a hub in different positions of axial adjustment to change the width of the wheel; a wheel element including a rim, a web extending radially inwardly from said rim, a plurality of sets of attaching portions upon said web for connection with a hub as aforesaid, the attaching portions in said sets being equally spaced radially from the wheel element axis and the attaching portions in each set being equally spaced circumferentially about said axis, each attaching portion being flanked on each side in a circumferential direction by attaching portions of another set, each attaching portion having a bolt-receiving space, and the attaching portions in at least one of said sets being displaced axially of the wheel element.

CLARENCE C. HAAS.